April 7, 1925.
I. C. WOODWARD
DIFFERENTIAL MECHANISM
Filed Oct. 27, 1923
1,532,465
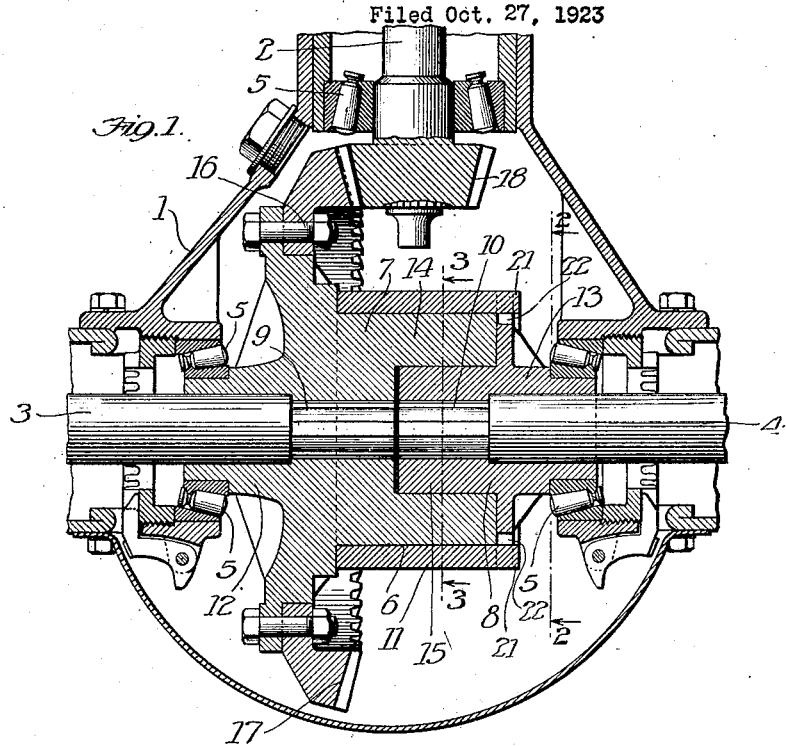
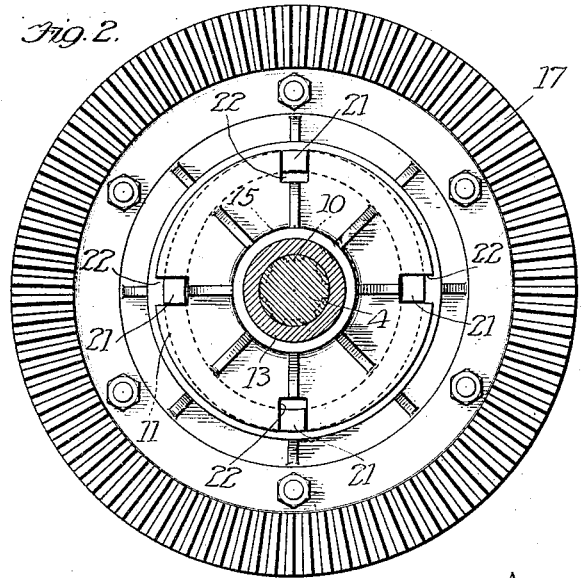
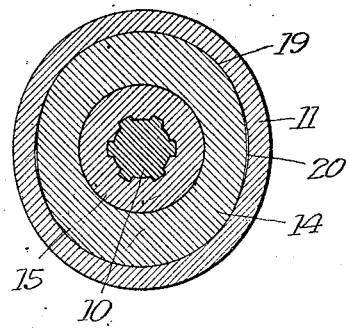
Witness
Martin H. Olsen.
Inventor
Irving C. Woodward,
By Kummler & Kummler
Attys Patented Apr. 7, 1925.

1,532,465

UNITED STATES PATENT OFFICE.

IRVING C. WOODWARD, OF SYRACUSE, NEW YORK.

DIFFERENTIAL MECHANISM.

Application filed October 27, 1923. Serial No. 671,132.

*To all whom it may concern:*

Be it known that I, IRVING C. WOODWARD, a citizen of the United States of America, and a resident of Syracuse, in the county of Onondaga and State of New York, have invented a new and useful Improvement in Differential Mechanisms, of which the following is a specification.

The main objects of this invention are to provide an improved form of differential mechanism for motor vehicles wherein a pair of driven members are positively driven as a unit under normal conditions, but have a differential action under some circumstances; and to provide a vehicle differential mechanism of the above kind wherein differential rotation is prevented until the effort of the driven members to differentiate in speed reaches a predetermined amount.

An illustrative embodiment of this invention is shown in the accompanying drawings, wherein—

Figure 1 is a section taken through the center of a differential mechanism constructed in accordance with this invention.

Fig. 2 is a section taken on the line 2—2 of Figure 1.

Fig. 3 is a section taken on the line 3—3 of Figure 1.

While it is appreciated that the standard form of planetary gear differentials operates in a most perfect manner under certain conditions, one of the purposes in making the present differential mechanism is to avoid the dangers incident to the standard form of differential gearing when the road conditions are not good, or when one wheel bounces from the road and speeds up as is possible with the planetary gear differential mechanism. Such speeding sometimes results in skidding, and if not, in at least a needless wearing of the tires and consumption of fuel, since when one wheel is spinning the power is dissipated in spinning the wheel instead of driving the wheel having good traction. By means of the present construction the advantages of a single axle drive mechanism wherein there is no differential mechanism are more or less attained without including the objectionable feature of the single axle wherein upon making a turn of short radius there is a tendency to overload and stop the engine due to its effort in dragging the outside wheel over the road to the extent necessary in making the turn.

The present construction is a compromise between the single or solid axle type of drive and the two-axle and differential gearing construction commonly employed, in that while it will permit differential rotation between the driven wheels when the effort to differentiate reaches a predetermined value, the two wheels will generally be driven at the same rate, regardless of whether one wheel bounces from the road or meets with a more slippery surface than that engaged by the other wheel.

It is a further aim of the invention to provide a much simpler construction than that generally employed to allow for differential motion between the driven axles, and thus to avoid the liability of such mechanism becoming injured under excessive strains.

The drawing shows the differential mechanism as embodying a coupling constructed in accordance with the invention set forth in my copending application, Serial No. 663,988, filed September 21, 1923, for an improvement in clutches.

In the form shown, the vehicle drive mechanism to which this invention is applied comprises the usual frame structure or housing 1, power shaft 2, and coaxial driven shafts 3 and 4 journaled in roller bearings 5 of the housing 1. Arranged between the driven shafts 3 and 4, is a coupling 6 constructed in accordance with the invention set forth in my above mentioned copending application, and involving the use of a pair of telescoping parts of normally different cross-sectional shapes, one of which is resilient and distorted by its assembly with the other part, and both of which parts are respectively connected to the driven shafts 3 and 4, whereby the relative rotation of said shafts is resisted by the resilience of the distorted part.

In the specific embodiment herein shown, the coupling 6 includes coaxial loosely interfitting rigid parts 7 and 8, splined as shown at 9 and 10 respectively to the shafts 3 and 4, and coacting with a resilient sleeve 11, which is arranged to resist relative rotation of said rigid parts, whereby said driven shafts are yieldingly clutched together so as to be capable of differential action only when the coupling is subjected to its maximum load.

The parts 7 and 8 include hub parts 12 and 13 respectively, supported in the bearings 5, and loosely interfitting hub parts 14 and 15 respectively arranged to axially aline the driven shafts 3 and 4, which extend through the splined openings 9 and 10 respectively of the parts 7 and 8.

Rigidly secured to the part 7, as by bolts 16, or other suitable fastening means, is a ring gear 17, which meshes with a pinion 18 fixed on the power shaft 2, whereby the part 7 and shaft 3 are positively driven at all times.

The hub 14 of the rigid part 7 provides a bearing face 19 of non-circular cross-section, on which the resilient sleeve 11 is telescopically arranged. The sleeve 11 is of normally circular cross-section, and is distorted to fit around the hub part 14. The diameter of the inner surface of the resilient sleeve 11 is slightly greater than the average diameter of the hub part 14, thus providing a space 20 for oil between the telescoping parts.

Formed on the outer end of the resilient sleeve 11 is a plurality of projections or lugs 21 which form clutch teeth for engaging radially disposed slots 22 formed in the member 8, whereby said sleeve and member 8 are positively clutched together so as to rotate as a unit. The relative arrangement of the lugs 21 and slots 22 permits a limited radial movement of the sleeve 11 relative to the member 8, which is necessary during any relative rotation of the resilient element 11 and the rigid part 7, due to the non-circular shape of the bearing face 19.

In operation, the shaft 3 is positively driven at all times through the ring gear 17 and rigid member 7, to which it is splined. Up to the maximum holding power of the clutch 6, the shafts 3 and 4 are driven as a unit. If the circumstances are such that the strain on the clutch is sufficient to overcome the holding power of the clutch, the resilient element 11 will slip on the hub part 14, thereby permitting some differential action between the shafts 3 and 4. When, however, the vehicle is driven in a straight path over a slippery or rough road, or on a steep grade, the shafts 3 and 4 rotate as a unit and prevent skidding, racing of the engine, loss of traction, and other troubles inherent in the usual differential gearing.

With respect to the operation of this device as compared with the planetary differential now commonly employed in the driving mechanisms for automobiles, applicant's construction provides a more fixed resistance to differential motion under all conditions of operation of the vehicle. With the planetary arrangement there is a one to two gear ratio between the housing of the differential, which carries the ring gear, and the driven axle when the remaining axle is held from moving, as would be the case when one wheel has good traction and the other none at all or insufficient traction to prevent it from spinning. Such condition is extremely dangerous and may result in throwing a car from the road when the driven wheels alternately have good and poor traction while the car is in motion and may have considerable momentum as there is then much unavoidable effort at speed changing even though the motor is running at a fixed rate. In applicant's construction neither of the driven axles can exceed the speed of the ring gear under any ordinary condition. The maximum speed which the engine is able to impart to the driven axles is the same as the speed of the ring gear. In making a turn, differential motion between the two axles is dependent upon the difference in resistance to rotation of the driven wheels equaling a certain predetermined percentage of the power delivered to the motor, plus the momentum of the car. Thus, applicant's differential mechanism is designed to offer a resistance to differential action which is proportional to the average speed, load, and power delivered by the motor. This differential mechanism does not have the needless freedom of movement that the planetary gear form has, and, therefore, no differential action takes place except when most required, that is, when a car has considerable momentum when making a turn. A planetary gear differential offers least resistance to differential motion just when such motion is worse than useless when the power, speed and load are lightest and the maximum resistance to differential motion upon an increase in power and speed.

A further undesirable addition to the resistance in a planetary gear differential is developed by the thrust or tooth pressure between the gears due to the momentum of the car in rapidly making a turn. The planetary gear transmission, therefore, results in a needless loss of power, both to too much freedom of action under some circumstances, and a binding action between the gears under other circumstances where a differential motion is actually required.

Although but one specific embodiment of this invention has been herein shown and described, it will be understood that numerous details of the construction shown may be altered or omitted without departing from the spirit of this invention as defined by the following claims.

I claim:

1. A vehicle drive mechanism comprising a pair of coaxial shafts, means for positively driving one of said shafts, a coupling between said shafts comprising a member of non-circular form secured to one of the shafts and a coacting member mounted for rotation with the remaining shaft and including a resilient element adapted to resiliently conform to the surface of said coacting non-circular member.

2. A differential mechanism including a driving member, a pair of driven members connected thereto, and a coupling connecting together said driven members, said coupling having telescoping parts of normally different cross sectional shapes, one of said parts being of noncircular cross section, the other of said parts being resilient and distorted to conform to said non-circular part whereby said driven members are normally secured against relative rotation by the resilience of said distorted part.

3. A differential mechanism including a driving member, a pair of coaxial driven shafts connected thereto, and a coupling splined on said driven shafts, said coupling having telescoping parts of normally different cross-sectional shapes, one of said parts being of non-circular cross-section, the other of said parts being resilient and distorted to conform to said non-circular part whereby said driven shafts are normally secured against relative rotation by the resilience of said distorted part.

4. A differential mechanism including a driving member, a pair of coaxial driven shafts connected thereto, a coupling yieldingly connecting together said driven shafts, said coupling including a pair of interfitting parts splined respectively to the inner ends of said shafts and adapted for relative rotation during any differential action of said shafts, and a resilient element telescopically arranged with respect to one of said parts and having interlocking engagement with the other part, said element and one part being normally of different cross sectional shapes and said resilient element being distorted to conform to said one part whereby said driven shafts are yieldingly secured against relative rotation by the resilience of said distorted member.

Signed at Syracuse this 24th day of Oct., 1923.

IRVING C. WOODWARD.